United States Patent [19]

Beavers

[11] Patent Number: 4,801,668
[45] Date of Patent: Jan. 31, 1989

[54] HIGH SOFTENING POINT HYDROCARBON RESINS FROM 1,5-CYCLOOCTADIENE

[75] Inventor: William A. Beavers, Longview, Tex.

[73] Assignee: Eastman Kodak Company, Rochester, N.Y.

[21] Appl. No.: 70,005

[22] Filed: Jul. 6, 1987

[51] Int. Cl.$^4$ ............................ C08F 4/14; C08F 32/06
[52] U.S. Cl. ..................................... 526/237; 526/308; 156/334
[58] Field of Search ...................... 526/237, 308, 348.2; 156/334

[56] References Cited

U.S. PATENT DOCUMENTS 2,964,575 12/1960 Sekul et al. .......................... 260/666
3,954,699 5/1976 Matsumura et al. ................ 526/308

FOREIGN PATENT DOCUMENTS 2438915 2/1975 Fed. Rep. of Germany ...... 526/308
7239388 12/1972 Japan ................................. 526/308
977931 12/1964 United Kingdom ................ 526/308

OTHER PUBLICATIONS

D. Yan, S. Li, X. Wu, P. Xia and Q. Gu, *Kexue Tongbao*, 29 1560 (1984).
B. Reichel, C. S. Marvel, and R. Z. Greenely, *J. Polymer Sci.*, Part A, 1, 2935 (1963).
A. Valvassori, G. Sartori, V. Turba, and M. P. Lachi, *J. Polymer Sci, Part C*, 16, 23 (1966) (Chemical Abstracts 66419n, vol. 66, 1967).
M. A. S. Mondal, R. N. Young, *Kinet Mech. Polyreactions*, Inst. Symp. Macromol. Chem. Preps., 1, 345 (1969) (Chemical Ab. 64313k, vol. 75, 1971).
H. Sarto, Y. Tanaka, and T. Taketomi, Makromol Chem., 178, 1993 (1977) Chemical Abstracts 87:53736x).
Cationic Transannular Polymerization of Norbornadiene, Kennedy et al., Polymer 6, 1965, pp. 133-140.

*Primary Examiner*—Joseph L. Schofer
*Assistant Examiner*—F. M. Teskin
*Attorney, Agent, or Firm*—Thomas R. Savitsky; William P. Heath, Jr.

[57] ABSTRACT

Processes for the preparation of low non-transannular, high softening point hydrocarbon resins from 1,5-cyclooctadiene are disclosed. In one aspect of the invention, 1,5-cyclooctadiene is heated in the presence of an aluminum halide catalyst at temperatures at or above 80° C. to give the desired resin. In another aspect of the invention, 1,5-cyclooctadiene is combined with a copolymerizable olefin in the presence of an aluminum halide catalyst at temperatures ranging from 30° C. to 250° C. The high softening point resins produced by these processes have levels of non-transannular impurities below 20% by weight, and these resins are particularly useful as wetting or bonding agents for coatings, adhesives, and other applications.

7 Claims, No Drawings

HIGH SOFTENING POINT HYDROCARBON RESINS FROM 1,5-CYCLOOCTADIENE

FIELD OF THE INVENTION

The invention relates to a high softening point hydrocarbon resins obtained from 1,5-cyclooctadiene which have a low level of non-transannular impurity, and a process for their preparation.

BACKGROUND OF THE INVENTION

Polymers produced from 1,5-cyclooctadiene are well known in the art, and there are numerous processes which have been developed to produce such polymers. Most polymers and oligomers produced from 1,5-cyclooctadiene are rubbery. For example, British Pat. No. 977,931 describes a low temperature co-oligomerization of 1,5-cyclooctadiene and ethylene to produce amorphous elastomers which are vulcanizable. Additionally, German Pat. No. 2,438,915 (equivalent to U.S. Pat. No. 3,954,699) and Japanese Kokai Pat. No. 7,239,388 both describe a similar rubbery product produced from 1,5-cyclooctadiene and cyclopentene at temperatures from −10° C. to 0° C. using a tungsten chloride catalyst. Rubbery oligomers and polymers of this type appear to be of the ring-opened variety, as described by Sato et al., Macromolecular Chemistry, 178, 1993 (1977). These products result from use of metathesis catalysts such as vanadium, tungsten, or molybdenum which readily open cyclic compounds at carbon-carbon double bonds, reattaching the fragments to produce very large cyclic or acyclic materials.

It is also possible to prepare polymers from 1,5-cyclooctadiene which differ from the generally acyclic, rubbery polymers described above. For instance, Mondal and Young, Macromolecular Chemical Preparations, 1, 349 (1969), describe co-polymerization of 1,5-cyclooctadiene and styrene at temperatures of −20° C. to 35° C. using a titanium chloride or stannic chloride-water catalyst. Yan et al., Kexue Tongbao, 29, 1560 (1984), describe an aluminum chloride polymerization of 1,5-cyclooctadiene at similar low temperatures which produces a polymer having a molecular weight of 1,750. Still others have used a Ziegler catalyst made from titanium tetrachloride and triisobutyl aluminum to polymerize 1,5-cyclooctadiene and methyl-cyclootadiene, respectively. (see J. Polymer. Sci., Part A, 1, 2935 (1963) and J. Polymer. Sci., Part C, 16, 23 (1966)).

These non-rubbery polymers, whether produced using a Lewis acid catalyst or a Ziegler catalyst, both as described above, all involve a transannular product from the 1,5-cyclooctadiene, as shown below:

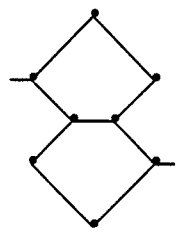

However, the products as produced by the prior art methods suffer from the drawback that they also contain high amounts of non-transannular impurities having the general formula:

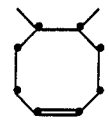

These non-transannular impurities have a marked effect on the polymer properties because the unused double bonds provide sites for side chain growth and cross-linking. These side chains and cross-linking sites caused by the high percentage of non-transannular impurity cause such polymers to be essentially globular and result in severely restricted compatabilities with polyethylene and polypropylene, and low solubilities in both aliphatic and aromatic organic solvents. It is thus desirable to obtain polymers produced from 1,5-cyclooctadiene which will have reduced levels of non-transannularity, which will exhibit high compatability with other hydrocarbon components, and which will have high softening points.

SUMMARY OF THE INVENTION

It has been discovered that a low non-transannular, high softening point hydrocarbon resin can be produced from 1,5-cyclooctadiene if this compound is polymerized in the presence of an aluminum halide catalyst at temperatures at or above about 80° C. Most prior art methods involving Lewis acid catalysts in the oligomerization of olefins take place at much lower temperatures. However, these higher temperature reactions give the desired low non-transannular product because new reaction pathways frozen out at lower temperature become accessible.

It has also been discovered that a low non-transannular, high softening point resin can be obtained when 1,5-cyclooctadiene is combined with a copolymerizable olefin in the presence of an aluminum halide catalyst, and the reaction is effected by heating the mixture at a temperature at or above around 30° C. By this method, the 1,5-cyclooctadiene reacts transannularly with an unusually low percentage of non-transannular sites. This low percentage of non-transannular impurity sites is the result of a rapid conversion of the non-transannularizable form into the transannularizable form of 1,5-cyclooctadiene under the present reaction conditions. The resulting resins have superior properties with regard to compatibility and solubility, and can be used more effectively as wetting agents or bonding agents in coatings, adhesives, and other applications.

DETAILED DESCRIPTION OF THE PREFERRED EMBODIMENTS

According to one aspect of the present invention, there is provided a process for preparing a low non-transannular, high softening point hydrocarbon resin which comprises providing a reaction mixture of 1,5-cyclooctadiene and an aluminum halide catalyst, and effecting reaction of the 1,5-cyclooctadiene by heating the mixture at a temperature at or above around 80° C.

This process is preferably carried out in a nitrogen flushed, oven-dried round bottom flask equipped with an overhead stirrer. The flask is charged with 1,5-cyclooctadiene and the aluminum halide catalyst, and the mixture is stirred and heated at a temperature above 80° C. for a time sufficient to effect the oligomerization reaction. The temperature in this process can range from about 80° C. to about 250° C., and is preferably in the range of about 120° C. to 160° C. At these preferred temperatures, the reaction time required for the oligomerization is anywhere from one-half hour to twenty hours, depending on catalyst type, catalyst concentration, and other reaction conditions. A reaction time of from two to six hours is preferred.

The aluminum halide catalyst used in this reaction can comprise anywhere from about 0.01 to about 20 percent by weight of the reaction mixture, depending on the temperature and other reaction conditions. It is particularly preferred that aluminum chloride or bromide be employed as the catalysts for the reaction, but aluminum fluoride and iodide are suitable as well.

The resins produced by the above reaction will generally be compatible with polyethylene and polypropylene, soluble in aliphatic and aromatic hydrocarbon solvents, amber in color (8–15 on the Gardner color scale), and will have high softening points of about 110° C. to 150° C. The resins are comprised of transannular recurring units having the formula:

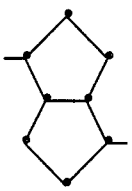

(I)

and having molecular weights of from about 500 to 2000. These resins also will have reduced amounts of non-transannular impurity having recurring units of the formula:

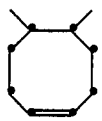

(II)

When the oligomerization reaction of 1,5-cyclooctadiene is carried out under the reaction conditions described above, the percentage of non-transannular impurity is reduced to not more than about 20% by weight. Generally, the amount of non-transannularity in the above resins will be about 5 to 15%, and preferably about 3 to 10%.

In another aspect of the present invention, low non-transannular, high softening point hydrocarbon resins are obtained by providing a reaction mixture of 1,5-cyclooctadiene, an aluminum halide catalyst, and at least one copolymerizable olefin of at least two carbon atoms, and effecting reaction of the 1,5-cyclooctadiene by heating the mixture at a temperature at or above about 30° C.

As above, this reaction is preferably carried out in a nitrogen flushed, over-dried round-bottom flask equipped with overhead stirrer. The flask is charged with 1,5-cyclooctadiene, aluminum halide catalyst, and the olefin or olefins, and the mixture is stirred and heated. The total amount of olefin employed in this reaction can be varied considerably, but it is preferred that the amount of 1,5-cyclooctadiene exceed 20 percent by weight.

The temperature used in this process of the invention can range from about 30° C. to about 250° C. The higher temperatures are used in conjunction with the lower catalyst concentrations suitable for a given olefin. Low oligomerization temperatures give low non-transannular resins which are yellow in color (3–7 on the Gardner color scale), have very high softening points (about 130° C.–190° C.), have low compatabilities with polyethylene and polypropylene, and are soluble in aromatic, but not aliphatic, solvents. These low oligomerization temperatures range from about 30° C. to about 140° C. depending on the nature and the amount of the olefin employed.

High oligomerization temperatures give a low non-transannular polymer resin of a type which is compatible with polyethylene and polypropylene, soluble in aliphatic and aromatic hydrocarbon solvents, amber in color (8–15 on the Gardner scale), and has a softening point of from about 110° C. to 150° C. High oligomerization temperatures are those which range from about 80° C. to about 250° C. depending on the nature and amount of the olefin in the reaction. Both high and low oligomerization temperature forms of the resins of the present invention have molecular weights ranging from 500 to 2000.

The percentage of non-transannular impurity will vary depending on the temperature of the reaction, but will usually be no more than 20% of the resins by weight. Polymerization conducted at temperatures of 80° C. and below give a non-transannular percentage of about 5 to 15%. Reactions at 80° C. and above will result in a resin with non-transannular impurity of as little as 3% by weight, depending on the catalyst concentration and the olefin employed.

The copolymerizable olefins used in the preparation of the resins of the present invention preferably contain one double bond not including any aromatic rings. Olefins containing two or more double bonds, not including aromatic rings, whether isolated or in conjugation, will react to form resins of a type similar to those formed using low oligomerization temperatures. These resins are not compatible with polyethylene or polypropylene, are soluble in aromatic hydrocarbon solvents but not aliphatic hydrocarbon solvents, are yellow in color, and have softening points of about 130° C.–190° C. Suitable olefins containing two or more double bonds include 1,3-butadiene, isoprene, piperylene, 1,5-hexadiene, 1,3,5-hexatriene, cyclopentadiene, dicyclopentadiene, 1,3-cyclooctadiene, and 1,5,9-cyclododecatriene, as well as the aliphatic and aromatic derivatives of these polyolefins.

The olefins used in the present invention can be cyclic or acyclic. Suitable cyclic mono-olefins include cyclopropene, cyclobutene, cyclopentene, cyclohexene, norbornene, cycloheptene, cyclooctene, and aliphatic and aromatic derivatives of these compounds. Examples of suitable acyclic olefins include ethylene, propylene, 1-butene, 2-butene, isobutylene, the pentenes, and the hexenes, as well as aliphatic and aromatic derivatives of these compounds such as styrene. These examples are merely illustrative of co-reactants utilizable in the above-described reaction, and many other suitable olefinic compounds will fall within the scope of the present invention. Further, suitable reactants will also comprise mixtures of mono-olefins containing 2 to 20 carbon atoms per molecule.

The percentage of mono-olefins in 1,5-cyclooctadiene which will form suitable resins depends on the nature of the mono-olefin. Those which form resins by themselves can be used in any amount, from 0 percent to about 100 percent, with the understanding that at the higher olefin percentages with 1,5-cyclooctadiene will contribute proportionally less to the resin nature and that the resin properties will be proportionally more like those of the homogenous olefin resin. Those which form only light hydrocarbons and oils by themselves can be used in smaller amounts, from 0 percent to 80 percent, with the understanding that the 1,5-cyclooctadiene will incorporate only that portion of the mono-olefin dictated by its chemical nature with the remainder either not reacting or reacting only with like mono-olefins.

The aluminum halide catalyst used to oligomerize the olefins and the 1,5-cyclooctadiene in this process is preferably aluminum chloride or aluminum bromide. Aluminum fluoride and iodide are also suitable but are slightly less efficient. The catalyst concentration can range from about 0.01 to 20 percent by weight, depending on the reactivity of the olefin and on the other reaction conditions.

The resins produced by this process will be comprised of the recurring units of formula I above, or will have recurring units with randomly interspersed mono-olefin co-reactants. This second type of resin will be comprised of recurring units having the formula:

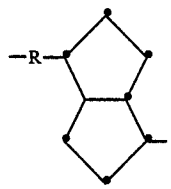

(III)

wherein R is a divalent hydrocarbon residue. The divalent hydrocarbon residue is a residue of an olefin bonded at the location of one former carbon-carbon double bond. These resins will also have a low percentage of non-transannular impurity, usually no more than 20% by weight.

The time required for this oligomerization depends upon the type of olefin used, the catalyst type and concentration, the reaction conditions, and the yield of properties desired in the final resin. The reaction time can range from one-half hour to about 20 hours, with a time of 2 to 6 hours preferred. Under the preferred conditions, the resin product is produced at yields of about 40 to 90 percent. The preferred products of the present invention are those which exhibit the properties described above for the high oligomerization temperature resins, i.e., high polyethylene and polypropylene compatibility, miscibility with aliphatic and aromatic organic solvents, and a softening point up to 150° C.

With reaction times below the most preferred levels, the result is resins in lower yield and with lower softening points, lower colors, and high compatibilities with polyethylene and polypropylene. Reaction times beyond the most preferred levels result in resins in higher yields and with higher softening points, high colors, and lower compatibilities with polyethylene and polypropylene. By adjusting the oligomerization conditions and, within limits, treatment of the resin after it has been prepared, softening points of subambient to 180° C., colors of 1 to 18 on the Gardner color scale, compatibilities of 0-100 percent with polyethylene and polypropylene, and solubilities of nil to miscibility with aliphatic and aromatic organic solvents may be attained by techniques well known to those acquainted with the resin arts.

The hydrocarbon resins produced in the present invention have utility in a variety of applications including coatings, adhesives, paints, and inks. The function of these resins is to serve as wetting agents or bonding agents in the applications. Resins of the present invention are desirable in these applications because their high softening points keep the material from oozing or flowing in use, and compatibility with other hydrocarbon components of a particular blend ensures maximum uniformity and strength by keeping materials from separating. Another advantage of the resins of the present invention is that they are easily hydrogenated by conventional methods when so desired.

The following examples are presented as merely illustrative of the present invention, and are not intended to limit the scope of the invention in any way.

EXAMPLE 1

To a nitrogen flushed, oven-dried, 500 mL, round-bottom flask equipped with an overhead stirrer was charged 175 grams of 1,5-cyclooctadiene and 1.75 grams of anhydrous aluminum chloride (1.0 weight percent). The mixture was stirred and heated to 140° C. for 4 hours. During this time, all of the catalyst dissolved giving a maroon colored solution which gradually thickened during the course of the reaction. When the reaction was finished it was worked up by diluting with an equal volume of mineral spirits and then using dilute aqueous sodium hydroxide to remove the catalyst. The organic layer was separated, dried, filtered, and the solvent was removed by heating under vacuum. The yield of the resulting resin was 82.3 percent. The resin displayed an 11 color on the Gardner scale, a ring and ball softening point of 121° C., a totally transparent solution upon admixing 20 percent of the resin with polyethylene and heating to 200° C. and only a slight haze upon admixing 20 percent of the resin with polypropylene and heating to 200° C. This example shows the ability to form useful resins with 1,5-cyclooctadiene and no added mono-olefin.

EXAMPLE 2

The conditions and catalyst charge for Example 1 were duplicated using 87.5 grams 1,5-cyclooctadiene and 87.5 grams of a mixture of cyclopentene derivatives as the substrate. The catalyst charge was 1.05 grams (0.6 weight percent). The resulting resin was produced in 69.2 percent yield. It displayed a 12 color on the Gardner scale, a ring and ball softening point of 122° C., a transparent solution upon admixing 20 percent resin with polyethylene and heating to 200° C., and a slightly hazy solution upon admixing 20 percent resin with polypropylene and heating to 200° C. This example shows the ability to form useful resins with 1,5-cyclooctadiene and cyclic mono-olefins.

EXAMPLE 3

The conditions and catalyst charge for Example 1 were duplicated using a 300-mL autoclave and 75 grams 1,5-cyclooctadiene and 75 grams of a mixture of isobutylene, 1-butene, cis-2-butene and trans-2-butene as the substrate. The catalyst charge was 3.50 grams (2.0 weight percent). The resulting resin was produced in 58.7 percent yield. It displayed an 11 color on the Gardner scale, a ring and ball softening point of 112° C., a transparent solution upon admixing 20 percent resin with polyethylene and heating to 200° C., and a slightly hazy solution upon admixing 20 percent resin with polypropylene and heating to 200° C. This example shows the ability to form useful resins with 1,5-cyclooctadiene and acyclic mono-olefins.

EXAMPLE 4

Example 1 was repeated using 0.52 grams (0.3 percent) catalyst and 87.5 grams 1,5-cyclooctadiene and 87.5 grams styrene. The resin was produced in 70.2 percent yield. It displayed an 11 color on the Gardner scale, a ring and ball softening point of 112° C., a hazy solution upon admixing 20 percent resin with polyethylene and heating to 200° C., and a hazy solution upon admixing 20 percent resin with polypropylene and heating to 200° C. The haziness in the polyethylene and polypropylene solutions was clarified, the Gardner scale color was reduced to 4, and the softening point was raised to 121° C. by the hydrogenation of this sample over nickel/alumina commercial catalyst at 240° C. for 2 hours at 3,000 psig hydrogen pressure. This example shows the ability to form useful resins from 1,5-cyclooctadiene and aromatic derivatives of mono-olefins.

EXAMPLE 5

Example 1 was repeated using 5.25 grams aluminum chloride (3.0 weight percent) and 70° C. as the oligomerization temperature. The resulting resin was produced in 73.3 percent yield. It displayed a 15 color on the Gardner scale, a ring and ball softening point of 153° C., a translucent solution upon admixing 20 percent resin with polyethylene and heating to 200° C., and an opaque solution upon admixing 20 percent resin with polypropylene and heating to 200° C. This example shows the production of less useful low oligomerization temperature resins from 1,5-cyclooctadiene.

EXAMPLE 6

Example 1 was repeated using aluminum bromide as the catalyst. The resulting resin was produced in 55.0 percent yield. It displayed an 8 color on the Gardner scale, a ring and ball softening point of 100° C., a transparent solution on admixing 20 percent resin with polyethylene and heating to 200° C., and a transparent solution upon admixing 20 percent resin with polypropylene and heating to 200° C. This example shows the production of suitable resins using aluminum bromide as the catalyst.

EXAMPLE 7

Example 1 was repeated using titanium tetrachloride as the catalyst. The resin yield was less than 1 percent and no properties were obtained. This examples shows the unsuitability of other Lewis acids such as titanium tetrachloride as an oligomerization catalyst for 1,5-cyclooctadiene resins.

EXAMPLE 8

Example 1 was repeated using tin tetrachloride as the catalyst. The resin yield was less than 1 percent and the reaction never developed the characteristic maroon catalyst complex color. No properties of the resin were obtained. This example shows the unsuitability of other Lewis acids such as tin tetrachloride as an oligomerization catalyst for 1,5-cyclooctadiene resins.

EXAMPLE 9

The resin produced in Example 1 was hydrogenated at 240° C. and 3,000 psig hydrogen pressure over a commercial nickel/alumina hydrogenation catalyst. The reaction time was 2 hours. At the end of this time, the product solution was dried, filtered, and the solvent was removed to give a resin in 98.6 percent yield (based on starting resin). The resin displayed a 2 color on the Gardner scale, a ring and ball softening point of 134° C., a transparent solution upon admixing 20 percent resin with ethylene and heating to 200° C., and a transparent solution upon admixing 20 percent resin with polypropylene and heating to 200° C. This example demonstrates the ease of hydrogenation and high yields of 1,5-cyclooctadiene transannular resins.

I claim:

1. A process for preparing a low non-transannular, high softening point hydrocarbon resin comprising recurring units having the formula

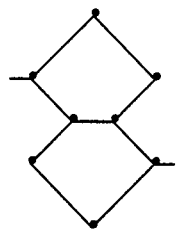

said resin having a molecular weight of about 500–2,000 and said resin having not more than about 20% by weight of recurring non-transannular units, said process comprising providing a reaction mixture of 1,5-cyclooctadiene and a catalyst consisting essentially of an aluminum halide, and effecting reaction of the 1,5-cyclooctadiene by heating the mixture at a temperature at or above about 80° C.

2. A process for preparing a low non-transannular, high softening point hydrocarbon resin comprising recurring units having the formula

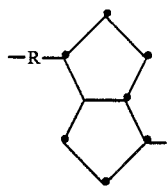

wherein R is a divalent hydrocarbon residue that is a residue of an olefin bonded at the location of one former carbon-carbon double bond, said process comprising providing a reaction mixture of 1,5-cyclooctadiene, a catalyst consisting essentially of an aluminum halide and at least one copolymerizable olefin of at least two carbon atoms, and effecting reaction of the 1,5-cyclooctadiene by heating the mixture at a temperature at or above about 30° C.

3. A process according to claim 2 which is carried out at a temperature ranging from about 30° C. to about 250° C.

4. A process according to claim 2 which is carried out at a temperature ranging from about 30° C. to about 140° C.

5. A process according to claim 2 which is carried out at a temperature ranging from about 80° C. to about 250° C.

6. A process according to claim 2 wherein at least one copolymerizable olefin is cyclic.

7. A process according to claim 2 wherein at least one copolymerizable olefin is acyclic.

* * * * *